United States Patent [19]
Ishii et al.

[11] Patent Number: 5,602,545
[45] Date of Patent: Feb. 11, 1997

[54] PRIORITY ENCODER

[75] Inventors: Yasuhiro Ishii, Kawasaki; Shigeharu Nakata, Yokohama, both of Japan

[73] Assignee: Kabushiki Kaisha Toshiba, Kawasaki, Japan

[21] Appl. No.: 462,035

[22] Filed: Jun. 5, 1995

[30] Foreign Application Priority Data

Jul. 15, 1994 [JP] Japan ................................. 6-164066

[51] Int. Cl.⁶ .................................................... G06F 7/00
[52] U.S. Cl. ............................ 341/50; 341/156; 341/160; 365/230.06; 365/203
[58] Field of Search ..................................... 341/156, 159, 341/160, 58; 320/1; 365/203, 230.6; 326/105

[56] References Cited

FOREIGN PATENT DOCUMENTS

0127988A1  12/1984  European Pat. Off. .
0440221A2   8/1991  European Pat. Off. .
3-226016   10/1991  Japan .
5-119965    5/1993  Japan .

*Primary Examiner*—Jeffrey A. Gaffin
*Assistant Examiner*—Peguy JeanPierre
*Attorney, Agent, or Firm*—Finnegan, Henderson, Farabow, Garrett & Dunner, L.L.P.

[57] ABSTRACT

The carry-line comprises a plurality of MOSFETs connected in series. MOSFETs precharge each node when they receive precharge signals /PR. In the case of high-order priority designated mode, when input signals are given for turning on MOSFETs located between one end of the high-order bit side of the carry-line, the control circuit discharges the intermediate node separately from the carry-line. In the case of low-order bit priority designated mode, when input signals are given for turning on MOSFETs located between one end of the low-order bit side of the carry-line and the intermediate node, the control circuit discharges the intermediate node separately from the carry-line.

65 Claims, 6 Drawing Sheets

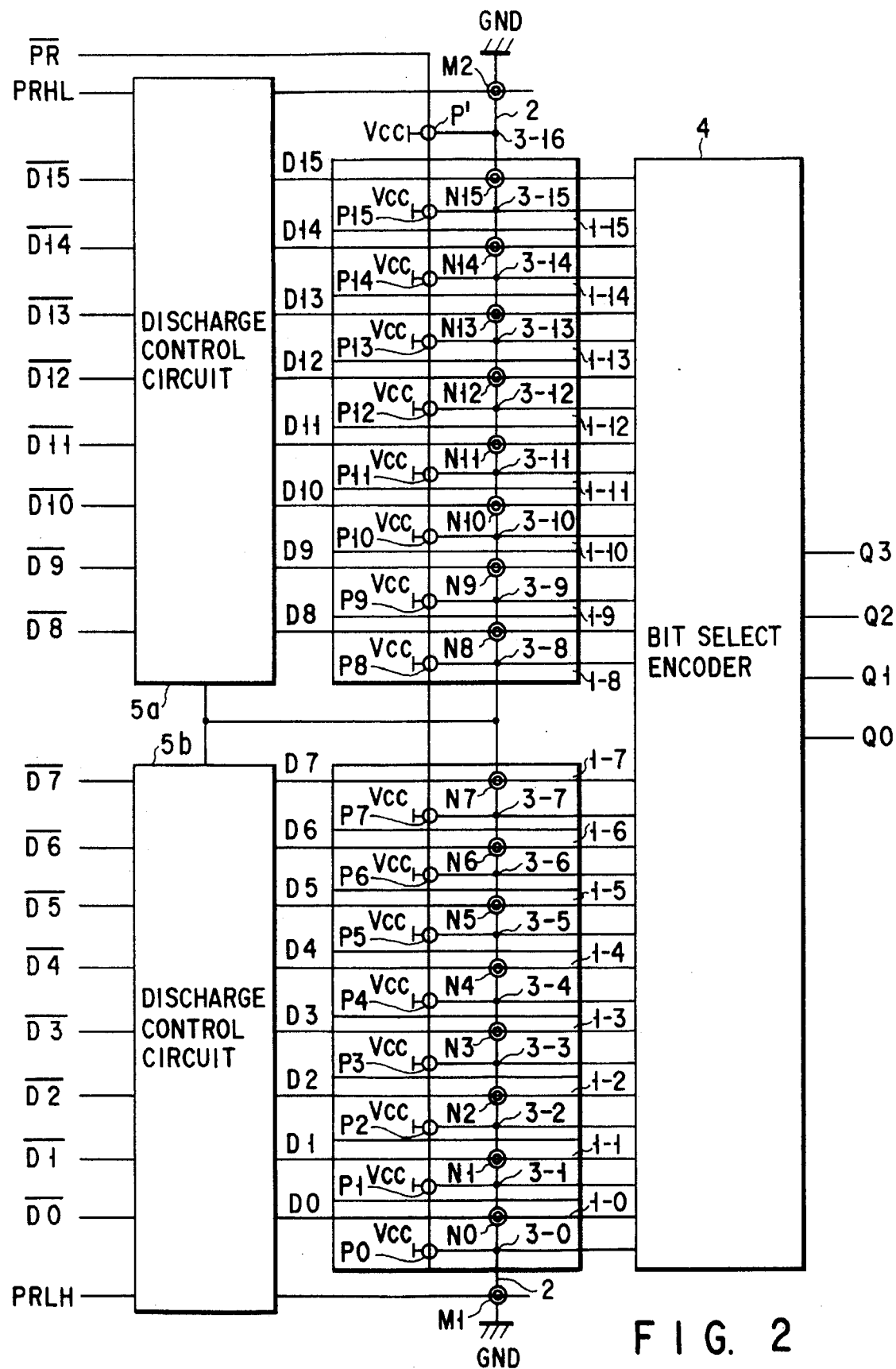
F I G. 2

PRIORITY ENCODER

BACKGROUND OF THE INVENTION

1. Field of the Invention

This invention relates to the priority encoder used in semiconductor integrated circuits.

2. Description of the Related Art

FIG. 1 shows a conventional dynamic type 16-bit priority encoder.

/D15 to /D0 are the input signals. The input signals /Dn (n=15, 14, . . . , 0) are inputted to the precharge and discharge sections 1-n (n=15, 14, . . . , 0), respectively.

The precharge and discharge sections 1-n comprise N channel type MOS transistor Nn (n=15, 14, . . . , 0) and P channel type MOS transistor Pn (n=15, 15, . . . , 0).

The source and drain of MOS transistor Nn are connected to the carry-line 2, and to the gate, the input signal /Dn is inputted. The input signal /Dn serves as a control signal for switching MOS transistor Nn. The source of MOS transistor Pn is connected to the power supply VCC, and to the gate, the precharge signal /PR is inputted.

The drain of MOS transistor Pn is connected to the node 3-n (n=15, 14, . . . , 0). The node 3-n is a connection point of source and drain of MOS transistor Nn of precharge and discharge sections 1-n and source and drain of MOS transistor N(n−1) of precharge and discharge sections 1-(n−1).

However, the node 3-0 (that is, n=0) is a connection point of source and drain of MOS transistor M of precharge and discharge sections 1-0 and source and drain of MOS transistor M1 for discharge. Now, let the connection point of source and drain of MOS transistor of precharge and discharge sections 1-15 and source and drain of MOS transistor M2 for discharge be the node 3-16.

On the high-order bit (/D15) side, the source of P channel type MOS transistor P' is connected to the power supply VCC, and to the gate, the precharge signal /PR is inputted. The drain of MOS transistor P' is connected to the node 3-16.

The source and drain of MOS transistor M1 for discharge is connected between one end on the low-order bit (/D0) side of the carry-line 2 and the grounding point GND. The source and drain of MOS transistor for discharge is connected between one end on the high-order bit (/D15) side of the carry-line 2 and the grounding point GND.

Each of nodes 3-n (n=16, . . . , 0) is precharged to the "1" level (power supply potential VCC) because MOS transistors Pn (n=15, . . . , 0) and P' are turned on when the precharge signal /PR becomes the "0" level.

When the low-order bit is in the priority mode, because control signal PRHL becomes the "1" level and the control signal PRLH the "0" level, MOS transistor M2 is turned on and MOS transistor M1 is turned off.

When the high-order bit is in the priority mode, because control signal PRHL is on the "1" level and control signal PRLH on the "0" level, MOS transistor M2 is turned on and MOS transistor M1 is turned off.

Each of nodes 3-n (n=16, . . . , 0) is discharged to the "0" level (grounding potential) in accord with the level of the input signal /Dn (n=15, . . . , 0).

To the bit select encoder circuit 4, input signal /Dn and potential of node 3-n of each of the precharge and discharge sections 1-n are inputted, respectively. The bit select encoder circuit 4 outputs 4-bit encoding output signals Q3 to Q0.

The priority encoder of the above configuration has the carry-line constructed by the pass transistor. Consequently, the ratio of the priority encoder are to the whole chip area can be designed to be comparatively small. However, it has a disadvantage in that it takes time to discharge all nodes of the carry-line as the number of bits of the input signal increases.

Next description will be made on the operation of the priority encoder.

This priority encoder is capable for judging which bit of the input signals /Dn is on the "0" level.

First of all, the low-order bit priority mode is considered.

The precharge signal /RP reaches the "0" level and each node 3-n (n=16, . . . , 0) is precharged to the "1" level (power supply potential VCC). Thereafter, the control signal PRLH reaches the "1" level and the control signal PRHL to the "0" level, and MOS transistor M1 enters the ON condition and MOS transistor M2 the OFF condition.

And each node 3-n is discharged in accordance with the level of the input signal /Dn. For example, if the high-order bit (/D15) only is on the "0" level and other bits (/D14-/D0) are on the "1" level, nodes 3-0 to 3-15 are discharged successively.

Next discussion will be made on the high-order bit priority mode.

The precharge signal /PR reaches the "0" level and all nodes 3-n (n=16, . . . , 0) are precharged to the "1" level (power supply potential VCC). Thereafter, the control signal PRHL reaches the "1" level and the control signal PRLH the "0" level, and MOS transistor M2 enters the ON condition and MOS transistor M1 the OFF condition.

And all nodes 3-n are discharged in accordance with the level of the input signal /Dn. For example, if the low-order bit (/D0) only is on the "0" level and other bits (/D15-/D1) are on the "1" level, nodes 3-15 to 3-0 are discharged successively.

In this way, the conventional priority encoder has a disadvantage in that it takes long time to discharge when the most significant bit or the bit near the most significant bit only is on the "0" level in the low-order bit priority mode, or when the least significant bit or the bit near the least significant bit only is on the "0" level in the high-order bit priority mode.

This disadvantage becomes more conspicuous as the number of bits of the input signal /Dn increases to 32 bits (n=31, . . . , 0), 64 bits (n=63, . . . , 0), etc., causing a bottleneck in high-speed processing.

In this way, in the conventional priority encoder, as the number of bits of input signal increases, the discharge time increases and this increase in the number of bits causes a bottleneck of high-speed processing, constituting a disadvantage.

SUMMARY OF THE INVENTION

The present invention is made to solve the above disadvantage, and accordingly, it is an object of the present invention to provide a priority encoder which has a small area and is capable for achieving high-speed operation even when the number of bits of input signal increases.

In order to accomplish this object, the priority encoder of the present invention comprises a plurality of switches which are connected in series one another, to both ends of which the primary potential is applied, and whose on-off operation is controlled by the input signal, a precharge means for precharging each node located between the plurality of switches to the secondary potential, the first discharge means for discharging the intermediate nodes of the plurality of switches when input signals are given for turning on all the switches between one end on the high-order bit side of the plurality of switches and the intermediate node of the plurality of switches in the high-order bit priority designated mode, and the second discharge means for discharging intermediate nodes of the plurality of switches to the primary potential when input signals are given for turning on all the switches between one end on the low-order bit side of the plurality of switches and intermediate node of the plurality of switches in the low-order bit priority designated mode.

The first discharge means comprises a detection circuit for outputting detection signals when input signals are given for turning on all the switches located between one end on the high-order bit side of the plurality of switches and the intermediate node of the plurality of switches, as well as all the switches for discharging the intermediate nodes of the plurality switches to the primary potential when the detection signal is received in the high-order bit priority designation mode.

The second discharge means comprises a detection circuit for outputting detection signals when input signals are given for turning on all the switches located between one end on the low-order bit side of the plurality of switches and the intermediate node of the plurality of switches, as well as all the switches for discharging the intermediate nodes of the plurality switches to the primary potential when the detection signal is received in the low-order bit priority designation mode.

The priority encoder according to the present invention comprises a plurality of switches which are connected in series one anther, to both ends of which the primary potential is applied and whose on-off operation is controlled by the input signal, a precharge means for precharging each node located between the plurality of switches to the secondary potential, and the first discharge means for discharging the first intermediate node of the plurality of switches to the primary potential when input signals are given for turning on all the switches located between one end of the high-order bit side of the plurality of switches and the first intermediate node of the plurality of switches in the high-order bit priority designation mode, the second discharge means for discharging the second intermediate node of the plurality of switches to the primary potential when input signals for turning on all the switches located between one end on the high-order bit side of the plurality of switches and the first intermediate node of the plurality of switches as well as all the switches located between the first intermediate node of the plurality of switches and the second intermediate node of the plurality of switches in the high-order bit priority designation mode and for discharging the first intermediate node of the plurality of switches to the primary potential when input signals are given for turning on all the switches located between one end on the low-order bit side of the plurality of switches and the third intermediate node of the plurality of switches, all the switches located between the third intermediate node of the plurality of switches and the second intermediate node of the plurality of switches, and all the switches located between the second intermediate node of the plurality of switches and the first intermediate node of the plurality of switches in the low-order bit priority designation mode, the third discharge means for discharging the second intermediate node of the plurality of switches to the primary potential when input signals are given for turning on all the switches located between one end on the low-order bit side of the plurality of switches and the third intermediate node of the plurality of switches, all the switches located between the third intermediate node of the plurality of switches and the second intermediate node of the plurality of switches in the low-order bit priority designation mode and for discharging the third intermediate node of the plurality of switches to the primary potential when input signals are given for turning on all the switches located between one end on the high-order bit side of the plurality of switches and the first intermediate node of the plurality of switches as well as all the switches located between the first intermediate node of the plurality of switches and the second intermediate node of the plurality of switches, and all the switches located between the second intermediate node of the plurality of switches and the third intermediate node of the plurality of switches in the high-order bit priority designation mode, and the fourth discharge means for discharging the third intermediate node of the plurality of switches to the primary potential when input signals for turning on all the switches located one end on the low-order side of the plurality of switches and the third intermediate node of the plurality of switches in the low-order bit priority designation mode.

According to the above configuration, in the case of the high-order bit priority mode, for example, when the input signal in which all the bits of one-half on the high-order bit side is on the "1" level is given, discharge is carried out from the intermediate node of the carry-line to the low-order bit side. That is, it is no longer necessary to discharge from the most significant bit to the low-order bit side.

In the case of the low-order bit priority mode, for example, when the input signal in which all the bits of one-half on the low-order bit side is on the "1" level is given, discharge is carried out from the intermediate node of the carry-line to the high-order bit side. That is, it is no longer necessary to discharge from the least significant bit to the high-order bit side.

Consequently, it becomes possible to greatly reduce the discharge time of the priority encoder according to this invention as compared to the discharge time of the conventional priority encoder. That is, it is possible to provide a priority encoder which can operate at high speed even when the number of bits increases.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a block diagram illustrating the priority encoder related to the first embodiment of the present invention;

DETAILED DESCRIPTION OF THE PREFERRED EMBODIMENTS

Figure 1:
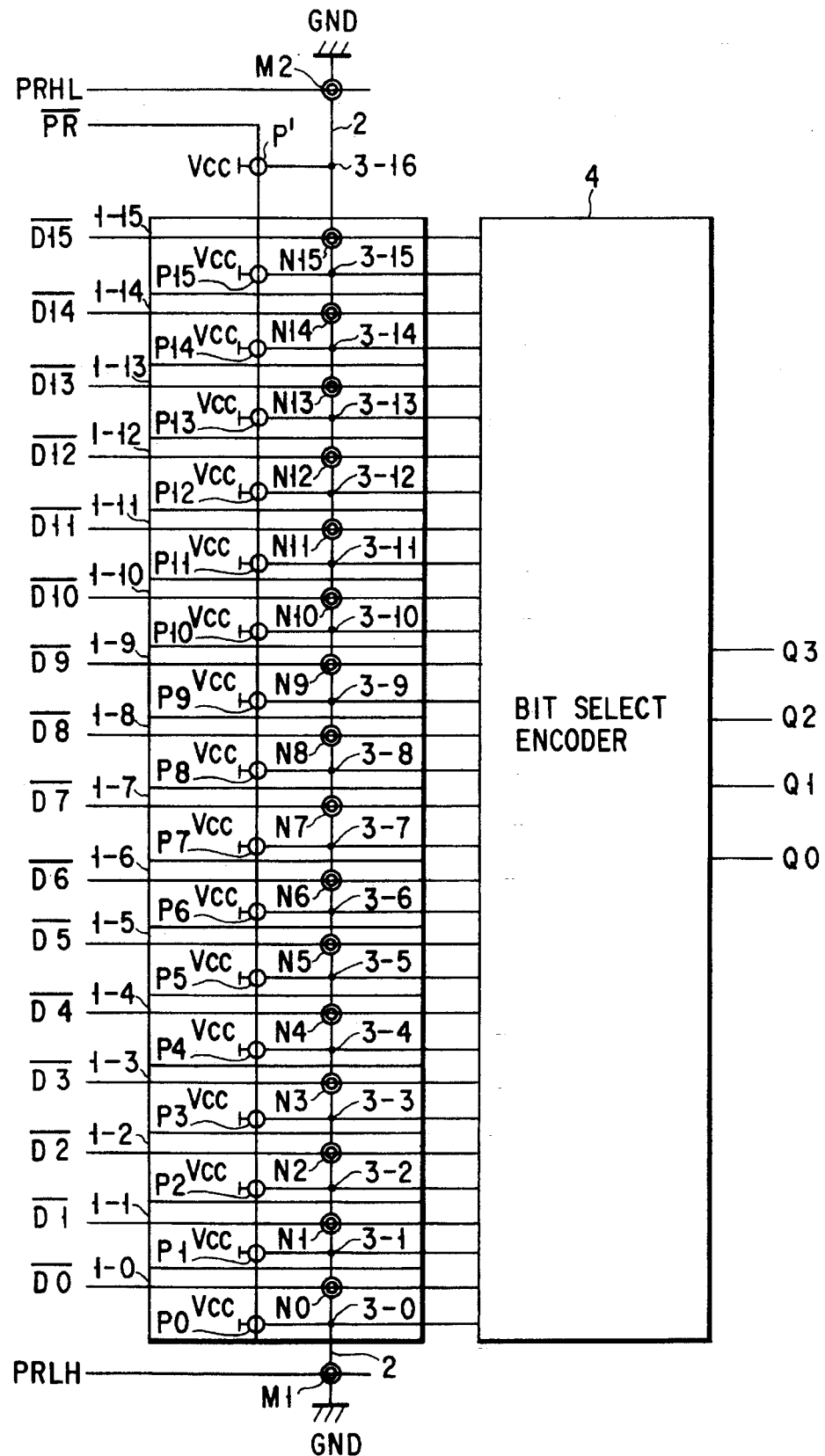
FIG. 1 is a block diagram illustrating a conventional priority encoder.

Referring now to drawing, the priority encoder according to the present invention will be described in detail.

FIG. 2 shows a dynamic type 16-bit priority encoder related to the first embodiment of the present invention.

/D15-/D0 are the input signals. The input signals /Dn (n=15, 14, ..., 0) are inputted to the precharge and discharge sections 1-n (n=15, 14, ..., 0), respectively.

The precharge and the discharge sections 1-n comprise N channel type MOS transistors Nn (n=15, 14, ..., 0) and P channel type MOS transistors Pn (n=15, 14, ..., 0).

The source and the drain of MOS transistors Nn are connected to the carry line 2 and to the gate, the computed input signal /Dn is inputted. The input signal /Dn serves as the control signal for switching MOS transistor Nn. The source of MOS transistor Pn is connected to the power supply VCC and to the gate, the precharge signal /PR is inputted.

The drain of the MOS transistor Pn is connected to the node 3-n (n=15, 14, ..., 0). The node 3-n is a connection point of the source and drain of MOS transistor Nn of the precharge and discharge section 1-n and the source and drain of MOS transistor N(n−1) of the precharge and discharge section 1-(n−1).

However, the node 3-0 (that is n=0) is a connection point of the source and drain of MOS transistor of the precharge and discharge section 1-0 and the source and drain of MOS transistor M1 for discharge. The connection point of the source and drain of MOS transistor of the precharge and discharge section 1-15 and the source and drain of M0S transistor M2 for discharge is designated to the node 3-16.

On the high-order bit (/D15) side, the source of P channel type MOS transistor P' is connected to the power supply VCC and to the gate, the precharge signal /PR is inputted. The drain of MOS transistor is connected to the node 3-16.

The source and drain of the MOS transistor M1 for discharge are connected between one end on the low-order bit (/D0) side of the carry line 2 and the grounding point GND. The source and drain of MOS transistor M2 for discharge are connected between one end of the high-order bit (/D15) side of the carry line 2 and the grounding point GND.

Each node 3-n (n=16, ..., 0) is precharged to the "1" level (power supply potential VCC) because MOS transistor Pn (n=15, ..., 0) and P' enter the ON condition when the precharge signal /PR reaches the "0" level.

In the case of the low-order bit priority mode, since the control signal PRLH becomes on the "1" level and the control signal PRHL on the "0" level, MOS transistor M1 enters the ON condition and MOS transistor M2 the OFF condition.

In the case of the high-order bit priority mode, since the control signal PRHL becomes on the "1" level and the control signal PRLH on the "0" level, MOS transistor M2 enters the ON condition and MOS transistor M1 the OFF condition.

Each node 3-n (n=16, ..., 0) is discharged to the "0" level (grounding potential) in accord with the level of the input signal /Dn (n=15, ..., 0).

To the bit select encoder circuit 4, the input signal /Dn and potential of node 3-n of each precharge and discharge section 1-n are inputted, respectively. The bit select encoder circuit 4 outputs 4-bit encode output signals Q3–Q0.

The discharge control circuit 5a detects whether the bits of one half of the high-order bit side is all on the "1" level or not when the input signal /Dn is divided into two: bits on the high-order bit side and those on the low-order bit side.

The discharge control circuit 5a is capable for discharging the node 3-8 immediately when one half of the bits of the high-order bit side are all on the "1" level in the high-order priority mode, that is, when the control signal PRHL is on the "1" level.

Similarly, the discharge control circuit 5b detects whether one half of the bits of the low-order bit side are all on the "1" level in the low-order priority mode when the input signal /Dn is divided into two bits on the high-order bit side and those on the low-order bit side.

And the discharge control circuit 5b is capable for discharging the node 3-8 immediately when half of the bits of the low-order bit side are all on the "1" level in the low-order priority mode, that is, when the control signal PRLH is on the "1" level.

According to the priority encoder of the said configuration, for example, in the case of high order bit priority mode, when one half of the input signals /D15 to/D8 on the high-order bit side are all on the "1" level, nodes from node 3-8 to those on the low-order bit side only are discharged successively. Consequently, in this priority encoder, the discharge time can be greatly reduced as compared to the conventional priority encoder which discharges nodes successively from node 3-15 to those on the low-order bit side.

For example, in the case of the low-order bit priority mode, when one half of the input signals /D7 to /D0 on the low-order bit side are all on the "1" level, nodes from node 3-8 to those on the high-order bit side only are discharged successively. Consequently, in this priority encoder, the discharge time can be greatly reduced as compared to the conventional priority encoder which discharges nodes successively from node 3-0 to those on the high-order bit side.

Figure 3:
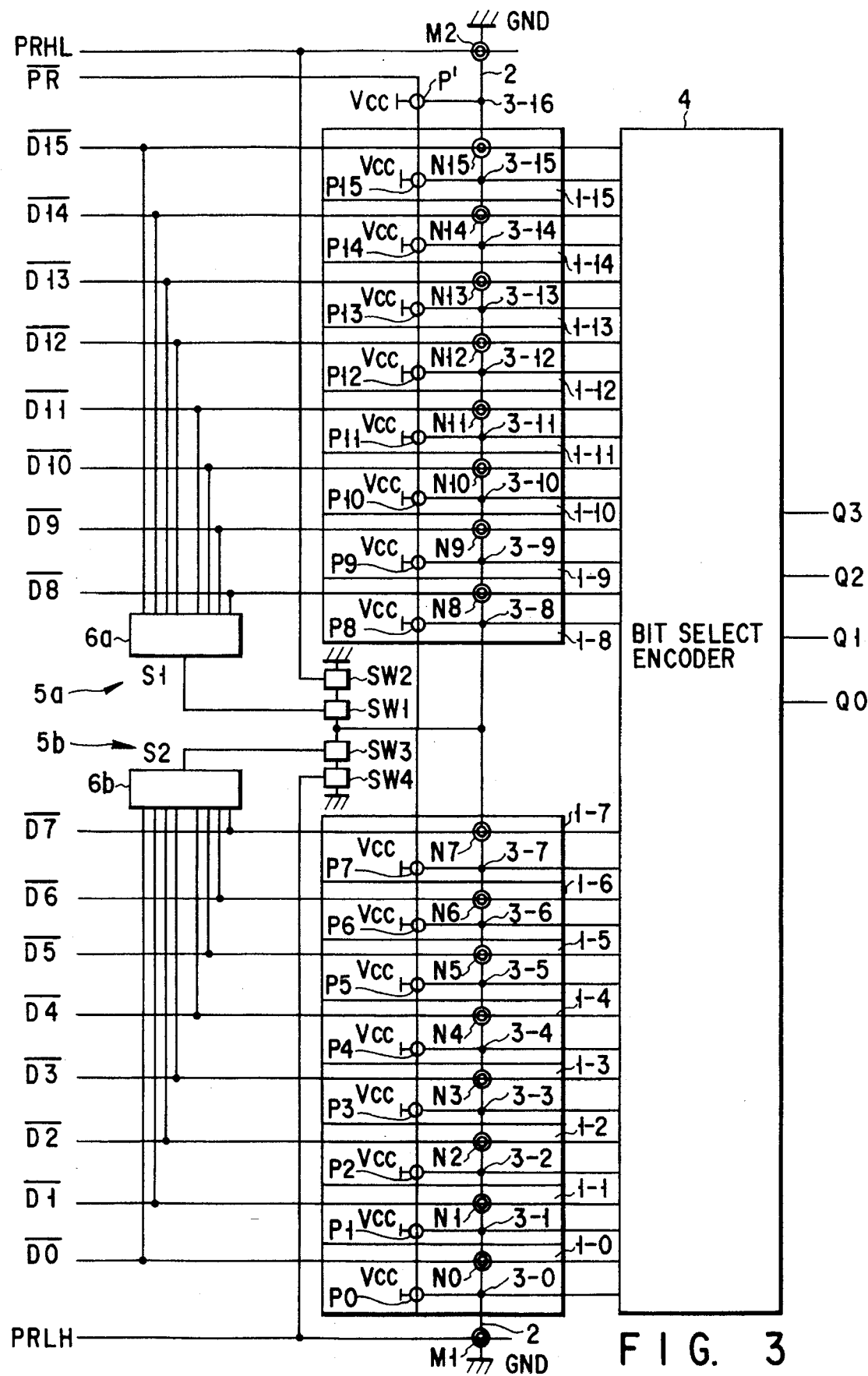
FIG. 3 is a block diagram illustrating a discharge control circuit shown in FIG. 2.

FIG. 3 shows the configuration of the discharge control circuits 5a, 5b of the priority encoder in FIG. 2.

The discharge control circuit 5a comprises a detection circuit 6a and switches SW1 and SW2.

The detection circuit 6a detects whether one half of the input signals /D15 to /D8 on the high-order bit side are all on the "1" level or not and outputs the detection signal S1 when the input signals /D15 to /D8 are all on the "1" level. The switch SW1 enters the ON condition when it receives the detection signal S1.

The switch SW2 detects whether the mode is the high-order bit priority mode or the low-order bit priority mode. Consequently, it enters the ON condition in the high-order bit priority mode, that is, when the control signal PRHL is on the "1" level.

When both switches SW1 and SW2 enter the ON condition, the node 3-8 is immediately discharged.

The discharge control circuit 5b comprises a detection circuit 6b and switches SW3 and SW4.

The detection circuit 6b detects whether one half of the input signals /D7 to /D0 on the low-order bit side are all on the "1" level or not and outputs the detection signal S2 when the input signals /D7 to /D0 are all on the "1" level. The switch SW3 enters the ON condition when it receives the detection signal S2.

The switch SW4 detects whether the mode is the high-order bit priority mode or the low-order bit priority mode. Consequently, it enters the ON condition in the low-order bit priority mode, that is, when the control signal PRLH is on the "1" level.

When both switches SW3 and SW4 enter the ON condition, the node 3-8 is immediately discharged.

Figure 4:
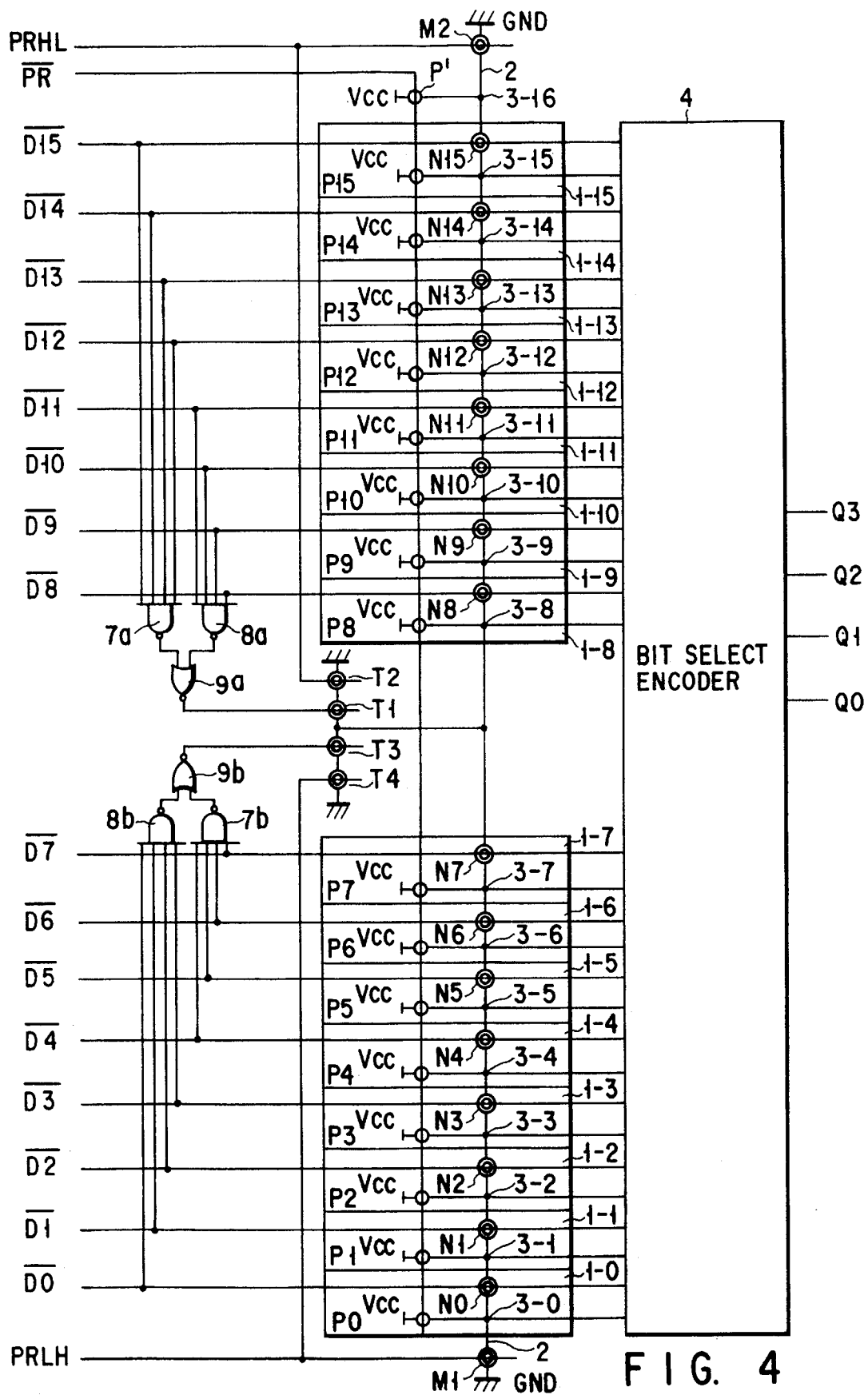
FIG. 4 is a circuit diagram illustrating the detection circuit and switches shown in FIG. 3.

FIG. 4 specifically shows the configuration of the detection circuits 6a and 6b and switches SW1 to SW4.

The detection circuit 6a comprises, for example, NAND circuits 7a and 8a and NOR circuit 9a.

The input signals /D15 to /D12 on the high-order bit side are inputted to the NAND circuit 7a. The NAND circuit 7a outputs the "0" level output signal when input signals /D15 to /D12 are all on the "1" level.

The input signals /D12 to /D8 on the high-order bit side are inputted to the NAND circuit 8a. The NAND circuit 8a outputs the "0" level output signal when input signals /D12 to /D8 are all on the "1" level.

The NOR circuit 9a receives output signals of NAND circuits 7a and 8a and outputs the "1" level detection signal S1 when both are on the "0" level.

The switch SW1 comprises, for example, an N channel type MOS transistor T1. Consequently, when it receives the "1" level detection signal S1, it enters the ON condition. The switch S2 comprises, for example an N channel type MOS transistor T2. Consequently, in the high-order bit priority mode, that is when the control signal PRHL is on the "1" level, the switch S2 enters the ON condition.

When both N channel type MOS transistors T1 and T2 enter the ON condition, the node 3-8 is immediately discharged.

The detection circuit 6b comprises, for example, NAND circuits 7b and 8b and NOR circuit 9b.

The input signals /D7 to /D4 on the low-order bit side are inputted to the NAND circuit 7b. The NAND circuit 7b outputs the "0" level output signal when input signals /D7 to /D4 are all on the "1" level.

The input signals /D3 to /D0 on the low-order bit side are inputted to the NAND circuit 8b. The NAND circuit 8b outputs the "0" level output signal when input signals /D3 to /D0 are all on the "1" level.

The NOR circuit 9b receives output signals of NAND circuits 7b and 8b and outputs the "1" level detection signal S2 when both are on the "0" level.

The switch SW3 comprises, for example, an N channel type MOS transistor T3. Consequently, when it receives the "1" level detection signal S2, it enters the ON condition. The switch SW4 comprises, for example an N channel type MOS transistor T4. Consequently, in the low-order bit priority mode, that is when the control signal PRLH is on the "1" level, the switch S4 enters the ON condition.

When both N channel type MOS transistors T3 and T4 enter the ON condition, the node 3-8 is immediately discharged.

The detection circuit 6a and switches SW1 and SW2 are not limited to the above configuration. That is, the detection circuit 6a may only be designed to bring the switch SW1 to the ON condition when input signals /D15 to /D8 are all on the "1" level and the switch SW2 to the ON condition in the high-order bit priority mode.

Similarly, the detection circuit 6b and switches SW3 and SW4 are not limited to the above configuration. That is, the detection circuit 6b may only be designed to bring the switch SW3 to the ON condition when input signals /D7 to /D0 are all on the "1" level and the switch SW4 to the ON condition in the low-order bit priority mode.

According to the priority encoder of the above configuration, when one half of the input signals on the high-order bit side /D15 to /D8 are all on the "1" level in the high-order bit priority mode, the node 3-8 is immediately discharged. Consequently, in this priority encoder, the discharge time can greatly be reduced as compared to the conventional priority encoder which discharges nodes from node 3-15 successively to nodes on the low-order bit side.

When one half of the input signals on the low-order bit side /D7 to /D0 are all on the "1" level in the low-order bit priority mode, the node 3-8 immediately is discharged. Consequently, in this priority encoder, the discharge time can greatly be reduced as compared to the conventional priority encoder which discharges nodes from node 3-0 successively to nodes on the high-order bit side.

Next discussion will be made on the operation of the priority encoder.

Table 1 shows the level of each bit of input signals /D15 to /D0.

TABLE 1

| Mode | Bit | | | | | | | | | | | | | | | | |
|---|---|---|---|---|---|---|---|---|---|---|---|---|---|---|---|---|---|
| | D15 | D14 | D13 | D12 | D11 | D10 | D9 | D8 | D7 | D6 | D5 | D4 | D3 | D2 | D1 | D0 | |
| High-order bit priority mode | 1 | 1 | 1 | 1 | 1 | 1 | 1 | 1 | 1 | 1 | 1 | 1 | 1 | 1 | 1 | 0 | Node 3-8 discharged |
| | 1 | 1 | 1 | 1 | 1 | 0 | 1 | 1 | 1 | 1 | 1 | 1 | 1 | 0 | 1 | 1 | Node 3-8 not discharged |
| Low-order bit priority mode | 0 | 1 | 1 | 1 | 1 | 1 | 1 | 1 | 1 | 1 | 1 | 1 | 1 | 1 | 1 | 1 | Node 3-8 discharged |
| | 1 | 1 | 1 | 1 | 0 | 1 | 1 | 1 | 1 | 1 | 0 | 1 | 1 | 1 | 1 | 1 | Node 3-8 not discharged |

First of all, the high-order bit priority mode is considered.

The precharge signal /PR reaches the "0" level and each of nodes 3-16 to 3-0 is precharged to the "0" level (power supply potential VCC). Thereafter, the control signal PRHL reaches the "1" level and the control signal PRLH the "0" level, and MOS transistor M2 enters the ON condition and MOS transistor M1 the OFF condition.

Because input signals /D15 to /D8 are all on the "1" level when the input signal /D0 only is on the "0" level, the intermediate node 3-8 of the carry line 2 is immediately discharged by the discharge control circuit 5a.

Consequently, discharge is carried out successively from the intermediate node 3-8 towards the low-order bit side and the bit /D0 is detected to be on the "0" level, and the bit select encoder circuit 4 outputs 4-bit output signals Q3="0", Q2="0", Q1="0", Q0="0".

On the other hand, because input signals /D15 to /D8 are not all on the "1" level when the input signals /D10 and/D2 are on the "0" level, the discharge control circuit 5a does not discharge the intermediate node 3-8 of the carry line 2.

Consequently, discharge is carried out successively from the node 3-15 towards the low-order bit side and the bit /D10 is detected to be on the "0" level, and the bit select encoder circuit 4 outputs 4-bit output signals Q3="1", Q2="0", Q1="1", Q0="0".

Now, the low-order bit priority mode is considered.

The precharge signal /PR reaches the "0" level and each of nodes 3-16 to 3-0 is precharged to the "1" level (power supply potential VCC). Thereafter, the control signal PRLH reaches the "1" level and the control signal PRHL the "0" level, and MOS transistor M1 enters the ON condition and MOS transistor M2 the OFF condition.

Because input signals /D7 to /D0 are all on the "1" level when the input signal /D15 only is on the "0" level, the intermediate node 3-8 of the carry line 2 is immediately discharged by the discharge control circuit 5b.

Consequently, discharge is carried out successively from the intermediate node 3-8 towards the high-order bit side and the bit/D15 is detected to be on the "0" level, and the bit select encoder circuit 4 outputs 4-bit output signals Q3="1", Q2="1", Q1="1", Q0="1".

On the other hand, because input signals /D7 to /D0 are not all on the "1" level when the input signals /D11 and/D5 are on the "0" level, the discharge control circuit 5b does not discharge the intermediate node 3-8 of the carry line 2.

Consequently, discharge is carried out successively from the node 3-0 towards the high-order bit side and the bit /D5 is detected to be on the "0" level, and the bit select encoder circuit 4 outputs 4-bit output signals Q3="0", Q2="1", Q1="0", Q0="1".

In the priority encoder of the above configuration, in the high-order bit priority mode, all of the input signals /D15 to /D8 are detected to be on the "1" level and as soon as precharge is finished, the intermediate node of the carry-line is discharged. In the case of the low-order bit priority mode, all of the input signals /D7 to /D0 are detected to be on the "1" level and as soon as precharge is finished, the intermediate node of the carry-line is discharged.

Consequently, in the priority encoder of the above configuration, the discharge time is that for 8 bits at maximum, one half the conventional discharge time, achieving great reduction in discharge time.

Figure 5:
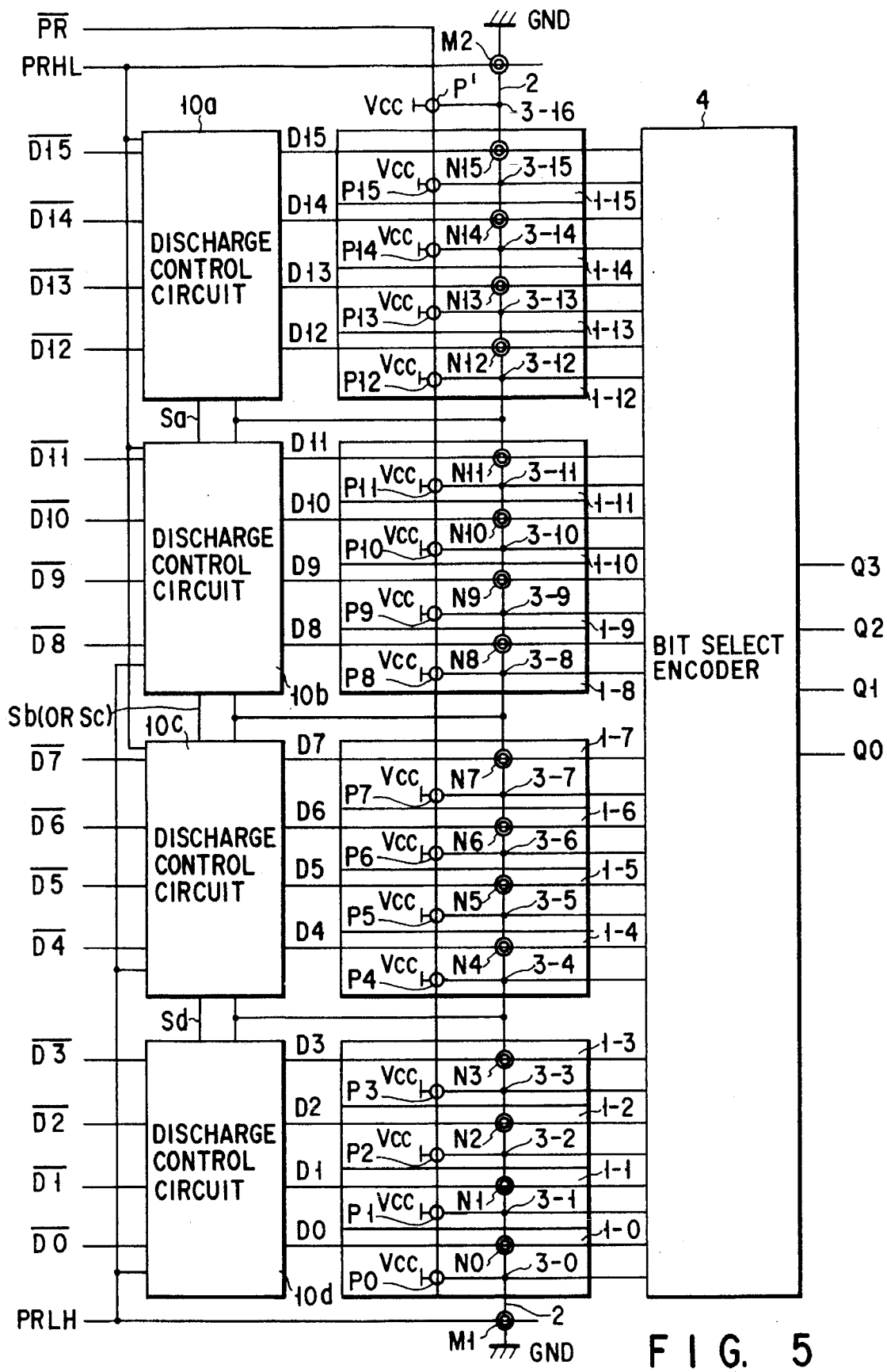
FIG. 5 is a block diagram showing the priority encoder related to the second embodiment of the present invention.

FIG. 5 shows a dynamic type 16-bit priority encoder related to the second embodiment of the present invention.

/D15-/D0 are the input signals. The input signals /Dn (n=15, 14, ..., 0) are inputted to the precharge and discharge sections 1-n (n=15, 14, ..., 0), respectively.

The precharge and the discharge sections 1-n comprise N channel type MOS transistors Nn (n=15, 14, ..., 0) and P channel type MOS transistors Pn (n=15, 14, ..., 0).

The source and the drain of MOS transistors Nn are connected to the carry line 2 and to the gate, the input signal /Dn is inputted. The input signal /Dn serves as the control signal for switching MOS transistor Nn. The source of MOS transistor Pn is connected to the power supply VCC and to the gate, the precharge signal /PR is inputted.

The drain of the MOS transistor Pn is connected to the node 3-n (n=15, 14, ..., 0). The node 3-n is a connection point of the source and drain of MOS transistor Nn of the precharge and discharge section 1-n and the source and drain of MOS transistor N(n−1) of the precharge and discharge section 1-(n−1).

However, the node 3-0 (that is n=0) is a connection point of the source and drain of MOS transistor of the precharge and discharge section 1-0 and the source and drain of MOS transistor M1 for discharge. The connection point of the source and drain of MOS transistor of the precharge and discharge section 1-15 and the source and drain of MOS transistor M2 for discharge is designated to the node 3-16.

On the high-order bit (/D15) side, the source of P channel type MOS transistor P' is connected to the power supply VCC and to the gate, the precharge signal /PR is inputted. The drain of MOS transistor is connected to the node 3-16.

The source and drain of the MOS transistor M1 for discharge are connected between one end on the low-order bit (/D0) side of the carry line 2 and the grounding point GND. The source and drain of MOS transistor M2 for discharge are connected between one end of the high-order bit (/D15) side of the carry line 2 and the grounding point GND.

Each node 3-n (n=16, ..., 0) is precharged to the "1" level (power supply potential VCC) because MOS transistor Pn (n=15, ..., 0) and P' enter the ON condition when the precharge signal /PR reaches the "0" level.

In the case of the low-order bit priority mode, since the control signal PRLH becomes on the "1" level and the control signal PRHL on the "0" level, MOS transistor M1 enters the ON condition and MOS transistor M2 the OFF condition.

In the case of the high-order bit priority mode, since the control signal PRHL becomes on the "1" level and the control signal PRLH on the "0" level, MOS transistor M2 enters the ON condition and MOS transistor M1 the OFF condition.

Each node 3-n (n=16, ..., 0) is discharged to the "0" level (grounding potential) in accord with the level of the input signal /Dn (n=15, ..., 0).

To the bit select encoder circuit 4, the input signal /Dn and potential of node 3-n of each precharge and discharge section 1-n are inputted, respectively. The bit select encoder circuit 4 outputs 4-bit encode output signals Q3–Q0.

The discharge control circuit 10a detects whether the input signals /D15 to /D12 are all on the "1" level or not. And the discharge control circuit 10a is capable for immediately discharging the node 3-12 and outputting the "1" level control signal Sa in the case of the high-order priority mode, that is, when the control signal PRHL is on the "1" level and if the input signals /D15 to /D12 are all on the "1" level.

The discharge control circuit 10b detects whether the input signals /D11 to /D8 on the high-order bit side are all on the "1" level or not. And the discharge control circuit 10b is capable for immediately discharging the node 3-8 and outputting the "1" level control signal Sb in the case of the high-order priority mode, that is, when the control signal PRHL is on the "1" level and if the input signals /D11 to /D8 are all on the "1" level.

The control signal Sa is a signal which becomes on the "1" level when the input signals /D15 to /D12 are all on the "1" level and is outputted from the discharge control circuit 10a. Consequently, even if all the input signals /D11 to /D8 are on the "1" level but at least one of the input signals /D15 to /D12 is on the "0" level, the node 3-8 is not discharged.

The discharge control circuit 10b is capable for immediately discharging the node 3-12 when the input signals /D11 to /D8 are all on the "1" level and the control signal Sc is on the "1" level in the low-order bit priority mode, that is, when the control signal PRLH is on the "1" level.

The control signal Sc is a signal which becomes on the "1" level when the input signals /D7 to /D0 are all on the "1" level and is outputted from the discharge control circuit 10c. Consequently, even if all the input signals /D11 to /D8 are on the "1" level but the control signal Sc is on the "0" level, the node 3-12 is not discharged.

Similarly, the discharge control circuit 10c detects whether the input signals /D7 to /D4 on the low-order bit side are all on the "1" level or not. And the discharge control circuit 10c is capable for immediately discharging the node 3-4 in the case of the high-order bit priority mode, that is, when the control signal PRHL is on the "1" level and if the input signals /D7 to /D4 are all on the "1" level and the control signal Sb is on the "1" level.

The control signal Sb is a signal which becomes on the "1" level when the input signals /D15 to /D8 are all on the "1" level and is outputted from the discharge control circuit 10a. Consequently, even if all the input signals /D7 to /D4 are on the "1" level but if the control signal Sb is on the "0" level, the node 3-4 is not discharged.

The discharge control circuit 10c is capable for immediately discharging the node 3-8 and outputting the "1" level control signal Sc in the low-order bit priority mode, that is, when the control signal PRLH is on the "1" level, if all the input signals /D7 to D4 are on the "1" level and the control signal Sd is on the "1" level.

The control signal Sd is a signal which becomes on the "1" level when the input signals /D3 to /D0 are all on the "1" level and is outputted from the discharge control circuit 10d. Consequently, even if all the input signals /D7 to /D4 are on the "1" level and if at least one of the input signals /D3 to /D0 is on the "0" level, the node 3-8 is not discharged.

The discharge control circuit 10d detects whether the input signals /D3 to /D0 on the low-order bit side are all on the "1" level or not. The discharge control circuit 10d is capable for immediately discharging the node 3-4 and outputting the "1" level control signal Sd in the case of the low-order bit priority mode, that is, when the control signal PRLH is on the "1" level and if the input signals /D3 to D0 are all on the "1" level.

According to the priority encoder of the said configuration, for example, in the case of high-order bit priority mode, when the input signals /D15 to /D12 are all on the "1" level, nodes from node 3-12 to those on the low-order bit side only are discharged successively. When all the input signals /D15 to /D8 are on the "1" level, nodes from node 3-8 to those on the low-order bit side are discharged successively. In addition, when all the input signals /D15 to /D4 are on the "1" level, nodes from node 3-4 to those on the low-order bit side are discharged successively.

Consequently, in this priority encoder, the discharge time can be greatly reduced as compared to the conventional priority encoder which discharges nodes successively from node 3-15 to those on the low-order bit side.

For example, in the case of the low-order bit priority mode, when the input signals /D3 to /D0 are all on the "1" level, nodes from node 3-4 to those on the high-order bit side are discharged successively. When all the input signals /D7 to /D0 are on the "1" level, nodes from node 3-8 to those on the high-order bit side are discharged successively. In addition, when all the input signals /D11 to /D0 are on the "1" level, nodes from node 3-12 to those on the high-order bit side are discharged successively.

Consequently, in this priority encoder, the discharge time can be greatly reduced as compared to the conventional priority encoder which discharges nodes successively from node 3-0 to those on the low-order bit side.

Figure 6:
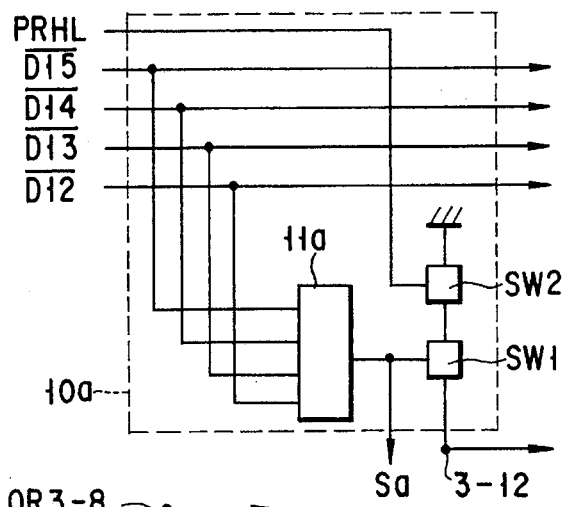
FIG. 6 is a block diagram showing the discharge control circuit in FIG. 5.
Figure 7:
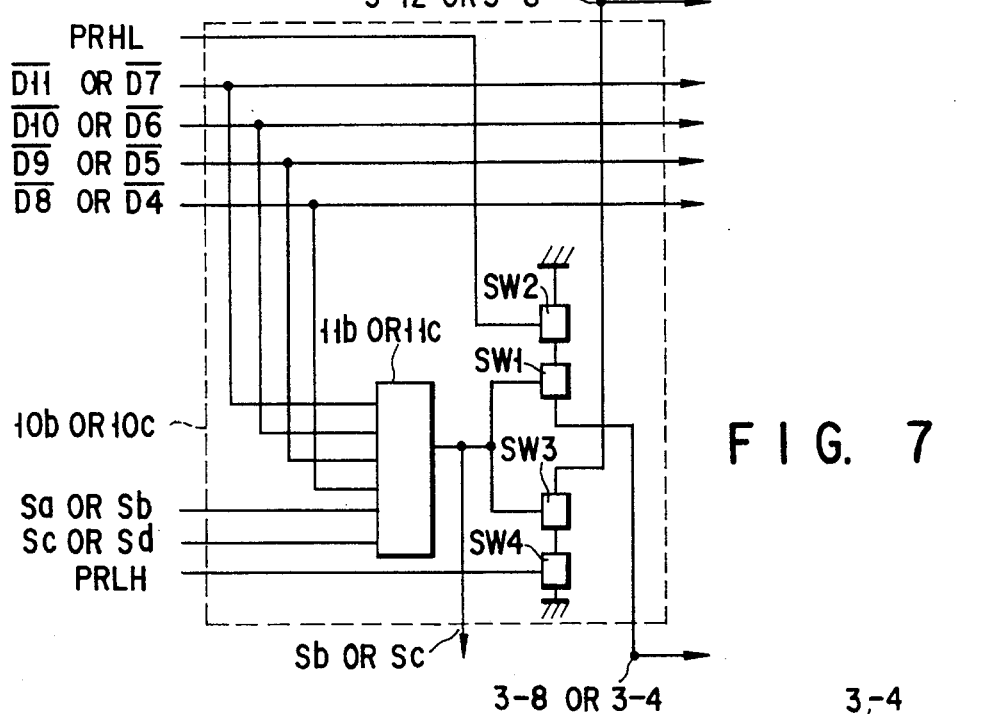
FIG. 7 is a block diagram showing the discharge control circuit in FIG. 5.
Figure 8:
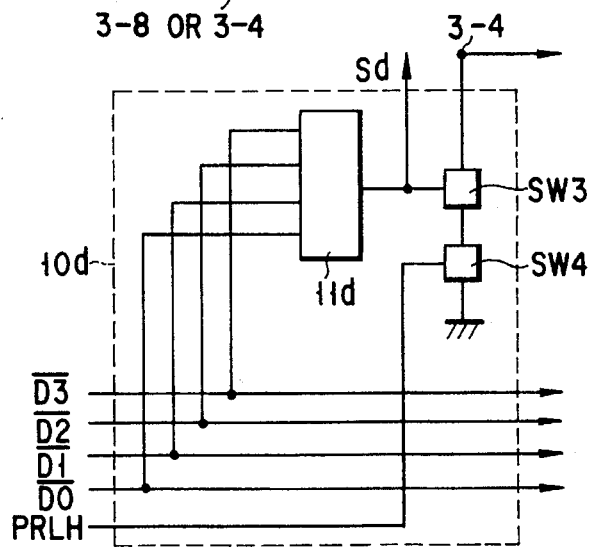
FIG. 8 is a block diagram showing the discharge control circuit in FIG. 5.

FIGS. 6 to 8 show the configuration of the discharge control circuits 10a to 10c of the priority encoder in FIG. 5.

FIG. 6 shows the discharge control circuit 10a.

The discharge control circuit 10a comprises a detection circuit 11a and switches SW1 and SW2.

The detection circuit 11a detects whether the input signals /D15 to /D12 on the high-order bit side are all on the "1" level or not and outputs the detection signal Sa when the input signals /D15 to /D12 are all on the "1" level. The switch SW1 enters the ON condition when it receives the detection signal Sa.

The switch SW2 detects whether the mode is the high-order bit priority mode or the low-order bit priority mode. Consequently, it enters the ON condition in the high-order bit priority mode, that is, when the control signal PRHL is on the "1" level.

When both switches SW1 and SW2 enter the ON condition, the node 3-12 is immediately discharged.

FIG. 7 shows discharge control circuits 10b and 10c.

The discharge control circuit 10b comprises a detection circuit 11b and switches SW1 through SW4.

The detection circuit 11b detects whether the input signals /D11 to /D8 are all on the "1" level or not and outputs the detection signal Sb when the input signals /D11 to /D8 are all on the "1" level and the control signal Sa is on the "1" level. The switch SW1 enters the ON condition when it receives the detection signal Sb.

In the low-order bit priority mode, the detection circuit 11b turns on the switch SW3 if all the input signals /D11 through /D8 are on the "1" level and the control signal Sc is on the "1" level.

Similarly, the detection circuit 11c detects whether input signals /D7 to /D4 are all on the "1" level or not. In the high-order bit priority mode, the detection circuit 11c turns on the switch SW1 if all the input signals /D7 through /D4 are on the "1" level and the control signal Sb is on the "1" level.

In the low-order bit priority mode, the detection circuit 11c outputs the control signal Sc if all the input signals /D7 to /D4 are on the "1" level and the control signal Sd is on the "1" level. The switch SW3 enters the ON condition when it receives the detection signal Sc.

Switches SW2 and SW4 detect whether the mode is the high-order bit priority mode or the low-order bit priority mode. Consequently, SW2 enters the ON condition in the high-order bit priority mode, that is, when the control signal PRHL is on the "1" level, while SW4 enters the ON condition in the low-order bit priority mode, that is, when the control signal PRLH is on the "1" level.

When both switches SW1 and SW2 enter the ON condition, the node 3-8 (or 3-4) is immediately discharged and when both switches SW3 and SW4 enter the ON condition, the node 3-12 (or 3-8) is immediately discharged.

FIG. 8 shows discharge control circuit 10d.

The discharge control circuit 11d detects whether the input signals /D3 to /D0 are all on the "1" level or not and outputs the detection signal Sd when the input signals /D3 to /D0 are all on the "1" level.

The switch SW3 enters the ON condition when it receives the detection signal Sd.

The switch SW4 detects whether the mode is the high-order bit priority mode or the low-order bit priority mode. Consequently, it enters the ON condition in the low-order bit priority mode, that is, when the control signal PRLH is on the "1" level.

When both switches SW3 and SW4 enter the ON condition, the node 3-4 is immediately discharged.

Next discussion will be made on the operation of the priority encoder shown in FIG. 5 to FIG. 8.

TABLE 2 shows the level of each bit of input signals /D15 to /D0.

TABLE 2

| Mode | Bit | | | | | | | | | | | | | | | |
|---|---|---|---|---|---|---|---|---|---|---|---|---|---|---|---|---|
| | D15 | D14 | D13 | D12 | D11 | D10 | D9 | D8 | D7 | D6 | D5 | D4 | D3 | D2 | D1 | D0 |
| High-order bit priority mode | 1 | 1 | 1 | 1 | 1 | 1 | 1 | 1 | 1 | 1 | 1 | 1 | 1 | 1 | 1 | 0 |
| | 1 | 1 | 1 | 1 | 1 | 1 | 1 | 1 | 1 | 1 | 0 | 1 | 1 | 1 | 1 | 1 |
| (Low-order bit priority mode) | 1 | 1 | 1 | 1 | 1 | 0 | 1 | 1 | 1 | 1 | 1 | 1 | 1 | 1 | 1 | 1 |
| | 0 | 1 | 1 | 1 | 1 | 1 | 1 | 1 | 1 | 1 | 1 | 1 | 1 | 1 | 1 | 1 |

First of all, the high-order bit priority mode is considered.

The precharge signal /PR reaches the "0" level and each of nodes 3-16 to 3-0 is precharged to the "1" level (power supply potential VCC). Thereafter, the control signal PRHL reaches the "1" level and the control signal PRLH the "0" level, and MOS transistor M2 enters the ON condition and MOS transistor M1 the OFF condition.

Because input signals /D15 to /D4 are all on the "1" level when the input signal /D0 only is on the "0" level, the discharge control circuits 10a through 10c immediately discharge nodes 3-12, 3-8, and 3-4 of the carry line 2.

Consequently, discharge is carried out successively from the node 3-4 towards the low-order bit side and the bit /D0 is detected to be on the "0" level, and the bit select encoder circuit 4 outputs 4-bit output signals Q3="0", Q2="0", Q1="0", Q0="0".

Because input signals /D15 to /D8 are all on the "1" level when the input signal /D5 only is on the "0" level, the discharge control circuit 10a, 10b immediately discharge nodes 3-12 and 3-8 of the carry line 2.

Consequently, discharge is carried out successively from the node 3-8 towards the low-order "0" level, and the bit select encoder circuit 4 outputs 4-bit output signals Q3="0", Q2="1", Q1="0", Q0="1".

Because input signals /D15 to /D12 are all on the "1" level when the input signal /D10 only is on the "0" level, the discharge control circuit 5a immediately discharges node 3-12 of the carry line 2.

Consequently, discharge is carried out successively from the node 3-12 towards the low-order bit side and the bit /D10 is detected to be on the "0" level, and the bit select encoder circuit 4 outputs 4-bit output signals Q3="1", Q2="0", Q1="1", Q0="0".

Because a "0" level bit is included in input signals /D15 to /D12 when the input signal /D15 only is on the "0" level, the discharge control circuits 10a to 10d do not discharge nodes 3-12, 3-8, and 3-4 of the carry line 2.

Consequently, discharge is carried out successively from the node 3-15 towards the low-order bit side and the bit /D15 is detected to be on the "0" level, and the bit select encoder circuit 4 outputs 4-bit output signals Q3="1", Q2="1", Q1="1", Q0="1".

Now, the low-order bit priority mode is considered.

The precharge signal /PR reaches the "0" level and each of nodes 3-16 to 3-0 is precharged to the "1" level (power supply potential VCC). Thereafter, the control signal PRLH reaches the "1" level and the control signal PRHL the "0" level, and MOS transistor M1 enters the ON condition and MOS transistor M2 the OFF condition.

Because a "0" level bit is included in the input signals /D3 to /D0 when the input signal /D0 only is on the "0" level, nodes 3-12, 3-8, and 3-4 of the carry line 2 are not discharged by the discharge control circuits 10a through 10d.

Consequently, discharge is carried out successively from the intermediate node 3-0 towards the high-order bit side and the bit /D0 is detected to be on the "0" level, and the bit select encoder circuit 4 outputs 4-bit output signals Q3="0", Q2="0", Q1="0", Q0="0".

Because input signals /D3 to /D0 are all on the "1" level when the input signal /D5 only is on the "0" level, the discharge control circuit 10d immediately discharge the node 3-4 of the carry line 2.

Consequently, discharge is carried out successively from the node 3-4 towards the high-order bit side and the bit /D5 is detected to be on the "0" level, and the bit select encoder circuit 4 outputs 4-bit output signals Q3="0", Q2="1", Q1="0", Q0="1".

Because input signals /D7 to /D0 are all on the "1" level when the input signal /D10 only is on the "0" level, the discharge control circuits 10c, 10d immediately discharge the nodes 3-8 and 3-4 of the carry line 2.

Consequently, discharge is carried out successively from the node 3-8 towards the high-order bit side and the bit /D10 is detected to be on the "0" level, and the bit select encoder circuit 4 outputs 4-bit output signals Q3="1", Q2="0", Q1="1", Q0="0".

Because input signals /D11 to /D0 are all on the "1" level when the input signal /D15 only is on the "0" level, the discharge control circuits 5a through 5c immediately discharge nodes 3-12, 3-8, and 3-4 of the carry line 2.

Consequently, discharge is carried out successively from the node 3-12 towards the high-order bit side and the bit /D15 is detected to be on the "0" level, and the bit select encoder circuit 4 outputs 4-bit output signals Q3="1", Q2="1", Q1="1", Q0="1".

In the priority encoder of the above configuration, in the high-order bit priority mode, all of the input signals /D15 to /D4 are detected to be on the "1" level and as soon as precharge is finished, the intermediate node 3-4 of the carry-line is discharged.

In the case of the low-order bit priority mode, all of the input signals /D11 to /D0 are detected to be on the "1" level and as soon as precharge is finished, the intermediate node 3-12 of the carry-line is discharged.

Consequently, in the priority encoder of the above configuration, the discharge time is that for 4 bits at maximum, one quarter the conventional discharge time, achieving great reduction in discharge time.

As described above, according to the priority encoder according to the present invention, the following effects are able to be achieved.

In the case of high-order bit priority mode, for example, when one half of the all the bits on the high-order bit side are on the "1" level, discharge takes place from the intermediate node of the carry-line towards the low-order bit side.

In the case of low-order bit priority mode, for example, when one half of the all the bits on the low-order bit side are on the "1" level, discharge takes place from the intermediate node of the carry-line towards the high-order bit side.

Consequently, the discharge time of the priority encoder according to the present invention can reduce to one half at maximum that of the conventional priority encoder. That is, even when the number of bits increases, a priority encoder which can operate at high speed can be provided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A priority encoder comprising:

a plurality of switches which are connected in series to one another, and whose on-off is controlled by input signals, one of outermost ones of said plurality of switches having a first end, the other of the outermost ones of said plurality of switches having a second end;

first discharge means connected to the first end of said one of the outermost ones of said plurality of switches, said first discharge means applying a first potential to the first end in a high-order bit priority designated mode;

second discharge means connected to the second end of said other of the outermost ones of said plurality of switches, said second discharge means applying the first potential to the second end in a low-order bit priority designated mode;

precharge means for precharging nodes between said plurality of switches to a second potential;

first discharge control means for discharging an intermediate node of said plurality of switches to the first potential when input signals are given for turning on all the switches located between the first end of said one of the outermost ones of said plurality of switches and the intermediate node of said plurality of switches in the high-order bit priority designated mode; and second discharge control means for discharging the intermediate node of said plurality of switches to the first potential when input signals are given for turning on all of the switches between the second end of said other of the outermost ones of said plurality of switches and the intermediate node of said plurality of switches in the low-order bit priority designated mode.

2. The priority encoder according to claim 1, wherein said first discharge control means comprises:

a first detection circuit for outputting a first detection signal when input signals are given for turning on all of the switches located between the first end of said one of the outermost ones of said plurality of switches and the intermediate node of said plurality of switches;

a first switch circuit for discharging the intermediate node of said plurality of switches to the first potential when the first detection signal is received in the high-order bit priority designated mode, and said second discharge control means comprises:

a second detection circuit for outputting a second detection signal when input signals are given for turning on all the switches located between the second end of said other of the outermost ones of said plurality of switches and the intermediate node of said plurality of switches, and;

a second switch circuit for discharging the intermediate node of said plurality of switches to the first potential when the second detection signal is received in the low-order bit priority designated mode.

3. The priority encoder according to claim 2, wherein said first switch circuit comprises:

a first switch for discharging the intermediate node of said plurality of switches to the first potential when the first detection signal is received;

a second switch for applying the first potential to said first switch in the high-order bit priority designated mode;

a third switch for discharging the intermediate node of said plurality of switches to the first potential when the second detection signal is received; and a fourth switch for applying the first potential to said third switch in the low-order bit priority designated mode.

4. The priority encoder according to claim 1, wherein each of said plurality of switches comprises an N channel type MOS transistor.

5. The priority encoder according to claim 1, wherein said first discharge means comprises a first switch which is connected between a grounding point and the first end of said one of the outermost ones of said plurality of switches, said first switch being turned on to apply a ground potential to the first end in the high-order bit priority designated mode, and said second discharge means comprises a second switch which is connected between the grounding point and the second end of said other of the outermost ones of said plurality of switches, the second switch being turned on to apply the ground potential to the second end in the low-order bit priority designated mode.

6. The priority encoder according to claim 5, wherein each of said first switch and said second switch comprises an N channel type MOS transistor.

7. The priority encoder according to claim 1, wherein said precharge means comprises a plurality of precharge switches, each of which is connected between a power supplying point and an associated one of the nodes of said plurality of switches.

8. The priority encoder according to claim 7, wherein each of said plurality of precharge switches comprises a P channel type MOS transistor.

9. The priority encoder according to claim 1, wherein the first potential is a ground potential.

10. The priority encoder according to claim 1, wherein the second potential is a power source potential.

11. The priority encoder according to claim 1, wherein said plurality of switches constitutes a carry-line.

12. A priority encoder comprising:

a plurality of switches which are connected in series to one another, and whose on-off is controlled by input signals, one of outermost ones of said plurality of switches having a first end, the other of the outermost ones of said plurality of switches having a second end;

first discharge means connected to the first end of said one of the outermost ones of said plurality of switches, said first discharge means applying a first potential to the first end in a high-order bit priority designated mode;

second discharge means connected to the second end of said other of the outermost ones of said plurality of switches, said second discharge means applying the first potential to the second end in a low-order bit priority designated mode;

precharge means for precharging nodes between said plurality of switches to a second potential;

first discharge control means for discharging a first intermediate node of said plurality of switches to the first potential when input signals are given for turning on all the switches located between the first end of said one of the outermost ones of said plurality of switches and the first intermediate node of said plurality of switches in the high-order bit priority designated mode; and second discharge control means for discharging a second intermediate node of said plurality of switches to the first potential when input signals are given for turning on all the switches between the first end of said one of the outermost ones of said plurality of switches and the second intermediate node of said plurality of switches in the high-order bit priority designated mode, and for discharging the first intermediate node of the said plurality of switches to the first potential when input signals are given for turning on all of the switches located between the second end of said other of the outermost ones of said plurality of switches and the first intermediate node of said plurality of switches in the low-order bit priority designated mode;

third discharge control means for discharging the second intermediate node of said plurality of switches to the first potential when input signals are given for turning on all the switches located between the second end of said other of the outermost ones of said plurality of switches and the second intermediate node of said plurality of switches in the low-order bit priority designated mode, and for discharging a third intermediate node of said plurality of switches to the first potential when input signals are given for turning on all the switches located between the first end of said one of the outermost ones of said plurality of switches and the third intermediate node of the said plurality of switches in the high-order bit priority designated mode; and fourth discharge control means for discharging the third intermediate node of said plurality of switches to the first potential when input signals for turning on all of the switches located between the second end of said other of the outermost ones of said plurality of switches and the third intermediate node of said plurality of switches in the low-order bit priority designation mode.

13. The priority encoder according to claim 12, wherein:

said first discharge control means comprises (i) a first detection circuit for outputting a first detection signal when input signals are given for turning on all of the switches located between the first end of said one of the outermost ones of said plurality of switches and the first intermediate node of said plurality of switches, and (ii) a first switch circuit for discharging the first intermediate node of said plurality of switches to the first potential when the first detection signal is received in the high-order bit priority designated mode;

said second discharge control means comprises (i) a second detection circuit for outputting a second detection signal when input signals are given for turning on all the switches located between the first end of said one of the outermost ones of said plurality of switches and the second intermediate node of said plurality of switches in the high-order bit priority designated mode, or when input signals are given for turning on all the switches located between the second end of said other of the outermost ones of said plurality of switches and the first intermediate node of said plurality of switches in the low-order bit priority designated mode, and (ii) a second switch circuit for discharging the second intermediate node of said plurality of switches to the first potential when the second detection signal is received in the high-order bit priority designated mode, and for discharging the first intermediate node of said plurality of switches to the first potential when the second detection signal is received in the low-order bit priority designated mode;

said third discharge control means comprises (i) a third detection circuit for outputting a third detection signal when input signals are given for turning on all the switches located between the second end of said one of the outermost ones of said plurality of switches and the second intermediate node of said plurality of switches in the low-order bit priority designated mode, or when input signals are given for turning on all the switches located between the first end of said one of the outermost ones of said plurality of switches and the third intermediate node of said plurality of switches in the high-order bit priority designated mode, and (ii) a third switch circuit for discharging the second intermediate node of said plurality of switches to the first potential when the third detection signal is received in the low-order bit priority designated mode, and for discharging in the third intermediate mode of said plurality of switches to the first potential when the third detection signal is received in the high-order bit priority designated mode; and said fourth discharge control means comprises (i) a fourth detection circuit for outputting a fourth detection signal when input signals are given for turning on all the switches located between the second end of said other of the outermost ones of said plurality of switches and the third intermediate node of said plurality of switches, and (ii) a fourth switch circuit for discharging the third intermediate node of said plurality of switches to the first potential when the fourth detection signal is received in the low-order bit priority designated mode.

14. The priority encoder according to claim 12, wherein each of said plurality of switches comprises an N channel type MOS transistor.

15. The priority encoder according to claim 12, wherein said first discharge means comprises a first switch which is connected between a grounding point and the first end of said one of the outermost ones of said plurality of switches, said first switch being turned on to apply a ground potential to the first end in the high-order bit priority designated mode, and said second discharge means comprises a second switch which is connected between the grounding point and the second end of said other of the outermost ones of said plurality of switches, the second switch being turned on to apply the ground potential to the second end in the low-order bit priority designated mode.

16. The priority encoder according to claim 15, wherein each of said first switch and said second switch comprises an N channel type MOS transistor.

17. The priority encoder according to claim 12, wherein said precharge means comprises a plurality of precharge switches, each of which is connected between a power supplying point and an associated one of the nodes of said plurality of switches.

18. The priority encoder according to claim 17, wherein each of said plurality of precharge switches comprises a P channel type MOS transistor.

19. The priority encoder according to claim 12, wherein the first potential is a ground potential.

20. The priority encoder according to claim 12, wherein the second potential is a power source potential.

21. The priority encoder according to claim 12, wherein said plurality of switches constitutes a carry-line.

22. A priority encoder comprising:
a plurality of switches which are connected in series to one another, and whose on-off is controlled by input signals, one of outermost ones of said plurality of switches having a first end, the other of the outermost ones of said plurality of switches having a second end;
discharge means connected to the first end of said one of the outermost ones of said plurality of switches, said discharge means applying a first potential to the first end in a high-order bit priority designated mode;
precharge means for precharging nodes between said plurality of switches to a second potential; and
discharge control means for discharging an intermediate node of said plurality of switches to the first potential when input signals are given for turning on all of the switches located between the first end of said plurality of switches and the intermediate node of said plurality of switches in the high-order bit priority designated mode.

23. The priority encoder according to claim 22, wherein said discharge control means comprises:
a detection circuit for outputting a detection signal when input signals are given for turning on all the switches located between the first end of said one of the outermost ones of said plurality of switches and the intermediate node of said plurality of switches; and
a switch circuit for discharging the intermediate node of said plurality of switches to the first potential when the detection signal is received in the high-order bit priority designated mode.

24. The priority encoder according to claim 23, wherein said switch circuit comprises:
a first switch for discharging the intermediated node of said plurality of switches to the first potential when the detection signal is received; and
a second switch for applying the first potential to said first switch in the high-order bit priority designated mode.

25. The priority encoder according to claim 22, wherein each of said plurality of switches comprises an N channel type MOS transistor.

26. The priority encoder according to claim 22, wherein said discharge means comprises a first switch which is connected between a grounding point and the first end of said one of the outermost ones of said plurality of switches, said first switch being turned on to apply a ground potential to the first end in the high-order bit priority designated mode.

27. The priority encoder according to claim 26, wherein said first switch comprises an N channel type MOS transistor.

28. The priority encoder according to claim 22, wherein said precharge means comprises a plurality of precharge switches, each of which is connected between a power supplying point and an associated one of the nodes of said plurality of switches.

29. The priority encoder according to claim 28, wherein each of said plurality of precharge switches comprises a P channel type MOS transistor.

30. The priority encoder according to claim 22, wherein the first potential is a ground potential.

31. The priority encoder according to claim 22, wherein the second potential is a power source potential.

32. The priority encoder according to claim 22, wherein said plurality of switches constitutes a carry-line.

33. A priority encoder comprising:
a plurality of switches which are connected in series to one another, and whose on-off is controlled by input signals, one of outermost ones of said plurality of switches having a first end, the other of the outermost ones of said plurality of switches having a second end;
discharge means connected to the second end of said other of the outermost ones of said plurality of switches, said discharge means applying a first potential to the second end in a low-order bit priority designated mode;
precharge means for precharging nodes between said plurality of switches to a second potential; and
discharge control means for discharging an intermediate node of said plurality of switches to the first potential when input signals are given for turning on all of the switches between the second end of said other of the outermost ones of said plurality of switches and the intermediate node of said plurality of switches in the low-order bit priority designated mode.

34. The priority encoder according to claim 33, wherein said discharge control means comprises:
a detection circuit for outputting a detection signal when input signals are given for turning on all the switches located between the second end of said other of the outermost ones of said plurality of switches and the intermediate node of said plurality of switches; and
a switch circuit for discharging the intermediate node of said plurality of switches to the first potential when the detection signal is received in the low-order bit priority designated mode.

35. The priority encoder according to claim 34, wherein said switch circuit comprises:
a first switch for discharging the intermediate node of said plurality of switches to the first potential when the detection signal is received; and
a second switch for applying the first potential to said first switch in the low-order bit priority designated mode.

36. The priority encoder according to claim 33, wherein each of said plurality of switches comprises an N channel type MOS transistor.

37. The priority encoder according to claim 33, wherein said discharge means comprises a second switch which is connected between a grounding point and the second end of said other of the outermost ones of said plurality of switches, the second switch being turned ton to apply a ground potential to the second end in the low-order bit priority designated mode.

38. The priority encoder according to claim 37, wherein said second switch comprises an N channel type MOS transistor.

39. The priority encoder according to claim 33, wherein said precharge means comprises a plurality of precharge switches, each of which is connected between a power supplying point and an associated one of the nodes of said plurality of switches.

40. The priority encoder according to claim 39, wherein each of said plurality of precharge switches comprises a P channel type MOS transistor.

41. The priority encoder according to claim 33, wherein the first potential is a ground potential.

42. The priority encoder according to claim 33, wherein the second potential is a power source potential.

43. The priority encoder according to claim 33, wherein said plurality of switches constitutes a carry-line.

44. A priority encoder comprising:

a plurality of switches which are connected in series to one another, and whose on-off is controlled by input signals, one of outermost ones of said plurality of switches having a first end, the other of the outermost ones of said plurality of switches having a second end;

discharge means connected to the first end of said one of the outermost ones of said plurality of switches, said discharge means applying a first potential to the first end in a high-order bit priority designated mode;

precharge means for precharging nodes between said plurality of switches to a second potential; and discharge control means for discharging one of intermediate nodes of said plurality of switches to the first potential when input signals are given for turning on all of the switches located between the first end of said one of the outermost ones of said plurality of switches and said one of the intermediate nodes of said plurality of switches in the high-order bit priority designated mode.

45. The priority encoder according to claim 44, wherein said discharge control means comprises:

a detection circuit for outputting a detection signal when input signals are given for turning on all the switches located between the first end of slid one of the outermost ones of said plurality of switches and the intermediate node of said plurality of switches; and a switch circuit for discharging the intermediate node of said plurality of switches to the first potential when the detection signal is received in the high-order bit priority designated mode.

46. The priority encoder according to claim 45, wherein said switch circuit comprises:

a first switch for discharging said one of the intermediate nodes of said plurality of switches to the first potential when the detection signal is received; and a second switch for applying the first potential to said first switch in the high-order bit priority designated mode.

47. The priority encoder according to claim 44, wherein each of said plurality of switches comprises an N channel type MOS transistor.

48. The priority encoder according to claim 44, wherein said discharge means comprises a first switch which is connected between a grounding point and the first end of said one of the outermost ones of said plurality of switches, said first switch being turned on to apply a ground potential to the first end in the high-order bit priority designated mode.

49. The priority encoder according to claim 48, wherein said first switch comprises an N channel type MOS transistor.

50. The priority encoder according to claim 44, wherein said precharge means comprises a plurality of precharge switches, each of which is connected between a power supplying point and an associated one of the nodes of said plurality of switches.

51. The priority encoder according to claim 50, wherein each of said plurality of precharge switches comprises a P channel type MOS transistor.

52. The priority encoder according to claim 44, wherein the first potential is a ground potential.

53. The priority encoder according to claim 44, wherein the second potential is a power source potential.

54. The priority encoder according to claim 44, wherein said plurality of switches constitutes a carry-line.

55. A priority encoder comprising:

a plurality of switches which are connected in series to one another, and whose on-off is controlled by input signals, one of outermost ones of said plurality of switches having a first end, the other of the outermost ones of said plurality of switches having a second end;

discharge means connected to the second end of said other of the outermost ones of said plurality of switches, said discharge means applying the first potential to the second end in a low-order bit priority designated mode;

precharge means for precharging nodes between said plurality of switches to a second potential; and discharge control means for discharging one of intermediate nodes of said plurality of switches to the first potential when input signals are given for turning on all of the switches between the second end of said other of the outermost ones of said plurality of switches and said one of the intermediate nodes of said plurality of switches in the low-order bit priority designated mode.

56. The priority encoder according to claim 55, wherein said discharge control means comprises:

a detection circuit for outputting a detection signal when input signals are given for turning on all the switches located between the second end of said other of the outermost ones of said plurality of switches and the intermediate node of said plurality of switches; and a switch circuit for discharging the intermediate node of said plurality of switches to the first potential when the detection signal is received in the low-order bit priority designated mode.

57. The priority encoder according to claim 56, wherein said switch circuit comprises:

a first switch for discharging said one of the intermediate nodes of said plurality of switches to the first potential when the detection signal is received; and a second switch for applying the first potential to said first switch in the low-order bit priority designated mode.

58. The priority encoder according to claim 55, wherein each of said plurality of switches comprises an N channel type MOS transistor.

59. The priority encoder according to claim 55, wherein said discharge means comprises a second switch which is connected between a grounding point and the second end of said other of the outermost ones of said plurality of switches, the second switch being turned on to apply a ground potential to the second end in the low-order bit priority designated mode.

60. The priority encoder according to claim 59, wherein said second switch comprises an N channel type MOS transistor.

61. The priority encoder according to claim 55, wherein said precharge means comprises a plurality of precharge switches, each of which is connected between a power supplying point and an associated one of the nodes of said plurality of switches.

62. The priority encoder according to claim 61, wherein each of said plurality of precharge switches comprises a P channel type MOS transistor.

63. The priority encoder according to claim 55, wherein the first potential is a ground potential.

64. The priority encoder according to claim 55, wherein the second potential is a power source potential.

65. The priority encoder according to claim 55, wherein said plurality of switches constitutes a carry-line.

* * * * *

UNITED STATES PATENT AND TRADEMARK OFFICE
CERTIFICATE OF CORRECTION

PATENT NO. : 5,602,545
DATED : February 11, 1997
INVENTOR(S) : Yasuhiro ISHII et al.

It is certified that error appears in the above-indentified patent and that said Letters Patent is hereby corrected as shown below:

Claim 24, column 19, line 57, "intermediated" should read --intermediate--.

Claim 37, column 21, line 1, "ton" should read --on--.

Claim 45, column 21, line 43, "slid" should read --said--.

Signed and Sealed this

Fifth Day of May, 1998

Attest:

BRUCE LEHMAN

Attesting Officer

Commissioner of Patents and Trademarks